United States Patent
Roy

[15] 3,683,674
[45] Aug. 15, 1972

[54] MEASUREMENT OF PORE SIZE AND POROSITY

[72] Inventor: Salil K. Roy, New Brunswick, N.J.

[73] Assignee: American Standard Inc., New York, N.Y.

[22] Filed: Oct. 15, 1970

[21] Appl. No.: 80,948

[52] U.S. Cl. ..................................................73/38
[51] Int. Cl. .............................................G01n 15/08
[58] Field of Search ............73/432 R, 101, 104, 38

[56] References Cited

UNITED STATES PATENTS 3,380,292  4/1968  Le Fournier.................73/38

*Primary Examiner*—Louis R. Prince
*Assistant Examiner*—William A. Henry, II
*Attorney*—Sheldon H. Parker, Tennes I. Erstad and Robert G. Crooks

[57] ABSTRACT

The force required to drive a liquid out of a capillary is dependent upon the diameter of the capillary as well as the surface tension of the liquid and its contact angle with the material of the capillary. If a specimen of a porous material having capillaries is saturated with a liquid and rotated in a centrifuge, the force acting on the liquid is dependent upon the speed and the geometry of rotation. In this apparatus, a sample impregnated with a known liquid is rotated in a predetermined manner at the incremental constant speeds and the volume of liquid driven out of the sample is measured for each speed of rotation. From this information, a size-volume distribution of porosity of the sample and, therefore, of the material from which the sample was derived can be made.

12 Claims, 2 Drawing Figures

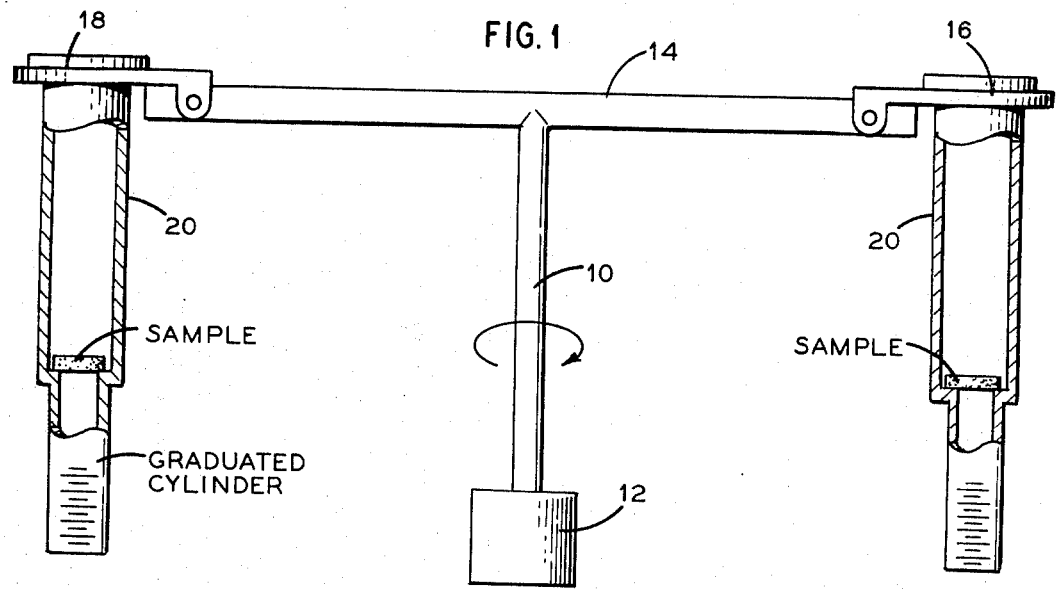
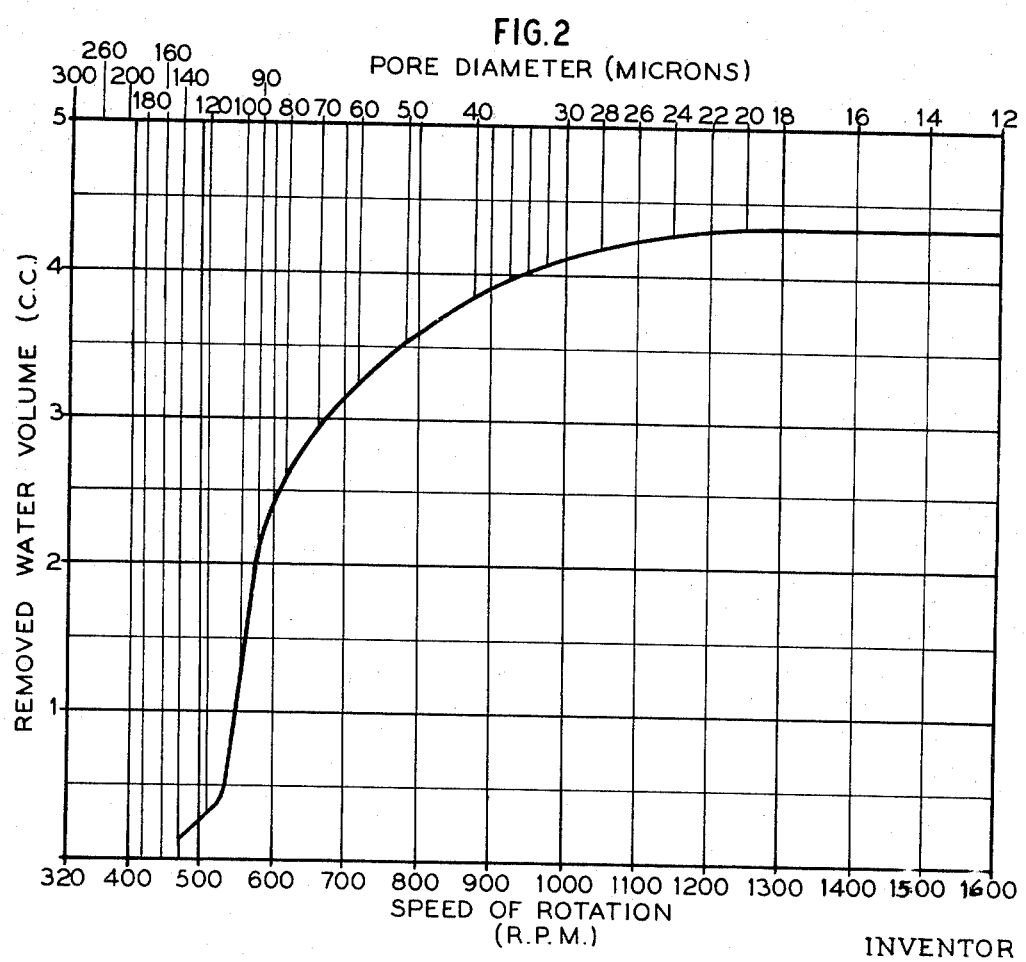

MEASUREMENT OF PORE SIZE AND POROSITY

1. Field of the Invention

This invention relates generally to a porosimeter and more specifically to the measurement of size-volume distribution of porosity of a porous member.

2. Description of the Prior Art

A determination of porosity is important when working with porous materials. A knowledge of the size distribution of pores is important when working with filters and the like. Pore size distribution information is also important when estimating the surface area of porous materials.

When determining the permeability of a substance, higher permeation rates are obtained with materials having larger pores. When passing gas, larger pores also result in larger bubbles and hence a smaller surface area of bubbles with a given amount of gas. However, very small pores are more susceptible to being plugged by impurities in the gas and, therefore, a compromise is required for most efficient use. Here again, a pore size distribution determination becomes necessary.

In a ceramic material, in most instances, pores are not usually uniform. Often, assumptions are made regarding shape; and, the situation is quite complicated due to the existence of tortuosity, inert and inactive porosity and interconnection of pores.

In U.S. Patent application entitled Pore Determination of a porous member; Ser. No. 750,231, now Pat. No. 3,524,341 filed Aug. 5, 1968 and assigned to the same assignee, there is disclosed a method and structure for determining pore characteristics of a porous structure wherein a porous sample approximately 5 cm. in diameter and 1 cm. in thickness, the pore size distribution of which is to be determined, is coated by any one of a number of methods with a metal to make the surface conducting. The application of a thin film of gold by the vapor deposition technique was found to give good results. The thickness of the film should be negligible compared to the diameter of the pores.

The sample with the metal deposit on it is placed into an evacuation chamber at a pressure of only a few microns for approximately one hour to remove all of the air from the pores. While the sample is still under vacuum, an electrolytic solution such as 0.1 N KCl is poured onto and covers completely the sample. The vacuum is then released and the sample is left immersed for a time sufficient to permit it to become impregnated with the electrolytic solution. A few minutes was found to be adequate.

The metal coated and electrolyte impregnated sample is then mounted in a gas tight manner by means of clay, wax or the like in a gas conducting passageway. Electrical conductors are positioned to contact the opposite surfaces of the sample and an impedance bridge which accurately measure resistance is coupled to the leads to measure the resistance across the sample.

Initially, the resistance of the sample is measured and noted. A gas under pressure is then applied to one surface of the sample and the resistance across the sample is again measured. The pressure across the sample is increased in steps and the resistance across the sample is measured for each pressure differential. The first change (increase) of resistance indicates the clearing of the largest diameter pores. As the pressure is further increased, the smaller diameter pores are also cleared. When the smallest diameter pores are cleared, the resistance rises sharply to a very high value. Depending upon the nature of the specimen, various resistance vs. pressure difference curves can be obtained.

By noting the various pressures at which there occurred a significant rise in resistance, the size range of most of the pores can be determined.

In still another U.S. Patent application entitled Permeability Cell, Ser. No. 750,148 filed Aug. 5, 1968 and assigned to the same assignee, there is disclosed a method and apparatus for determining pore characteristics of a porous sample wherein the dry permeability of the sample is first determined by feeding gas, under pressure to one side of the sample. Manometers are provided to measure the pressure of gas at each side of the sample, and the difference in pressure between the two phases of the test sample. A flowmeter is also provided to indicate flow through the sample.

For pore size determination of the sample, both the dry and wet permeability is required. The dry permeability of the sample can be determined as just noted. Wet permeability is determined in the same manner, the only difference being that the sample is first impregnated with a fluid such as water.

There are various methods of saturating a sample with water such as soaking the sample in water at room temperature; heating the sample while in water; and, evacuating and then impregnating the sample with water at room temperature.

In the last mentioned procedure, the sample is placed into an evacuation chamber at a pressure of only a few microns for approximately 1 hour to remove all the air from the pores of the sample. While the sample is still under vacuum, distilled water is poured onto and covers completely the sample. The vacuum is then released and the sample is left immersed for a time sufficient to permit it to become impregnated with the water. A few minutes was found to be adequate.

To determine pore size, the permeability of air through the sample which has been saturated with water is also measured as a function of differential pressures, i.e., the difference of pressure between the entrance and the exit side of the sample.

SUMMARY OF THE INVENTION

Briefly, the force required to drive a liquid out of a capillary is dependent upon the diameter of the capillary as well as the surface tension of the liquid and its contact angle with the material of the capillary. If a specimen of a porous material having capillaries is saturated with a liquid and rotated in a centrifuge, the force acting on the liquid is dependent upon the speed and the geometry of rotation.

Thus, if a sample impregnated with a known liquid is rotated in a predetermined manner at incremental constant speeds and the volume of liquid driven out of the sample is measured for each speed of rotation, a size-volume distribution of porosity of the sample and, therefore, of the material from which the sample was derived can easily be made.

BRIEF DESCRIPTION OF THE DRAWINGS

FIG. 1 illustrates structure in accordance with the principles of the invention for determining the size-volume distribution of porosity of a specimen; and FIG. 2 illustrates a curve obtained when using structure in accordance with the principles of this invention.

DESCRIPTION OF A PREFERRED EMBODIMENT

Referring to FIG. 1, there is illustrated structure in accordance with the principles of this invention for determining the size-volume distribution of pores in a specimen.

The theory involved in this invention is that the force required to drive a liquid out of a capillary is dependent upon the diameter of the capillary as well as the surface tension of the liquid and its contact angle with the material of the capillary. If a specimen with capillaries is saturated with a liquid and centrifuged, the force acting on the liquid depends on the speed and geometry of rotation. Equating the surface tension force with the centrifugal force we have $$\pi r^2 \, l \, p \, w^2 \, x = 2 \, \pi \, v \, \gamma \, \cos \theta$$

where $r$ = radius of the capillary
$l$ = length of the capillary
$p$ = density of liquid in the capillaries
$w$ = speed of rotation in radius/sec.
$x$ = distance of the specimen from the center of rotation where $x > > l$
$\gamma$ = surface tension of the liquid
$\theta$ = contact angle Since the speed of rotation is normally expressed in RPM; R, the equation presented above can be rewritten as $$v = (1,800 \, \gamma \cos \theta / \pi^2 \cdot l \cdot p \cdot R^2 \cdot x) \, (CM)$$

From this equation it is evident that for a given geometry of rotation and for a constant sample size and fixed liquid, the radius of the capillary is inversely related to the square of the speed. Thus, if the fluid saturated specimen is revolved at incremental constant speeds and the volume of liquid driven out is measured for each speed of rotation, a size-volume distribution of porosity can be determined.

Thus, the pressure P required to clear a pore of a specimen having a radius, $v$, filled with a liquid of surface tension $\gamma$ is given by the following equation:

$$P = (2\gamma \cos \theta / v),$$

where:
$\theta$ is the contact angle.

Referring to the Figures, a centrifugal force is applied to a specimen saturated with a liquid. The sample or specimen preparation involves cutting a specimen to a size that will fit within a centrifugal tube, placing the specimen into a vacuum chamber, evacuating the air from the vacuum chamber and the sample, admitting a liquid of known surface tension and contact angle into the vacuum chamber to cover completely the sample, then relieving the vacuum in the vacuum chamber to cause the sample or specimen to be impregnated completely with the liquid. The impregnated sample is then fitted into a centrifugal tube. The centrifuge comprises a slinger device which includes a vertical shaft 10 supported at one end by and rotatably driven about its longitudinal axis by a drive means 12. The other end of the shaft 10 is rigidly secured to a center portion of a horizontal tension member 14 having a pivotable arm or holder 16 at one end and another pivotable arm 18 at the other end. The pivotable arms 16 and 18 can pivot about a shaft from a horizontal position. Each arm is shaped to receive and hold a specimen support tube 20. The internal diameter of the specimen support tube 20 is slightly larger than the diameter of the sample to permit the impregnated sample to be positioned within the tube. Holding means is provided to maintain the sample in position within the specimen support tube while the sample is resting in the gravitational field or is rotating in the centrifugal field. The lower or bottom end of the specimen support tube is closed to receive fluid centrifuged out of the impregnated sample. The bottom end of the specimen support tube also supports measuring means such as graduations to permit the measurement of the amount of liquid centrifuged out of the impregnated sample for each given speed of rotation of the centrifuge.

In operation, a sample impregnated with a liquid of known surface tension and contact angle such as water is positioned within the specimen support tube and retained in position by the holding means. The drive means is activated and the centrifuge is brought up to a predetermined speed in successive steps. The liquid volume centrifuged out of the impregnated sample after each incremental increase in the speed of the centrifuge is noted. From the speed and geometry of rotation it is possible to calculate the size-volume distribution of pores in the sample.

From the last presented equation it is evident that for a given geometry of rotation and for a constant sample size and fixed liquid, the radius of the capillary cleared of fluid is inversely related to the square of the speed. Thus, if the impregnated sample is centrifuged at increasing incremental constant speeds and the volume of liquid driven out of the sample is measured for each speed of rotation, a size-volume distribution of porosity can easily be made.

FIG. 2 illustrates in graph form the relationship of speed in revolution per minute vs. removed water in cubic centimeter from an impregnated sample of porous alumina. The top line of the graph is marked to indicate pore diameter in microns.

Obviously many modifications and variations of the present invention are possible in the light of the above teaching. It is, therefore, to be understood that the invention may be practiced otherwise than as specifically described herein.

What is claimed is:

1. A method of determining the size-volume distribution of porosity of a porous member comprising filling the pores of said porous member with a fluid, centrifuging said porous member at a constant speed, measuring the fluid centrifuged out of said porous member, and determining the size of pore cleared of fluid from the speed and fluid centrifuged out.

2. The method of claim 1 including the step of measuring the speed at which said porous member is being centrifuged.

3. The method of claim 2 wherein said fluid in said pores of said porous member comprises a liquid having a known surface tension and contact angle.

4. The method of claim 3 wherein said fluid in said pores of said porous member comprises water.

5. A method of determining the size-volume distribution of porosity of a porous member comprising filling the pores of said porous member with a fluid, centrifuging said porous member at increasing speeds in incremental steps, measuring the fluid centrifuged out of said porous member at each incremental step of speed, and determining the size-volume distribution of porosity of the porous member from the fluid centrifuged out of the porous member at the various incremental speeds.

6. The method of claim 5 including the step of measuring the speed of each incremental step at which said porous member is being centrifuged.

7. The method of claim 6 wherein said fluid in said pores of said porous member comprises a liquid having a known surface tension and contact angle.

8. The method of claim 6 wherein said fluid in said pores of said porous member comprises water.

9. Centrifuge mechanism for determining the size-volume distribution of porosity of a porous sample comprising a motor-driven slinger device; at least one sample tube suspended from the slinger device at a location spaced radially away from the slinger drive axis; said tube having an open end for insertion therethrough of a liquid-impregnated sample, a closed liquid-collector end, and a sample-supporting shoulder intermediate the open and closed ends; said tube being connected to the slinger device so that during rotation of the device the tube takes a generally radial position with its closed end disposed outwardly from the sample, whereby liquid in the sample is caused to be centrifugally thrown into the tube closed end.

10. The mechanism of claim 9 wherein the tube wall areas between the sample supporting shoulder and tube closed end are transparent and marked with graduations to permit visual observation of the amount of liquid collected in the tube closed end.

11. The mechanism of claim 10 wherein the slinger device is arranged for rotation in a horizontal plane; said slinger device including a rotary tension member, and a tube holder pivotally attached to said tension member so that the tube assumes a generally vertical position for sample loading and a horizontal position during centrifuging.

12. The mechanism of claim 11 wherein the tube is removably positioned in the holder to permit discharge of the used sample and collected liquid.

* * * * *